Aug. 6, 1957 H. C. WENDT 2,801,542
GYRO SETTING APPARATUS
Filed Oct. 29, 1954 4 Sheets-Sheet 1

Fig.1

Inventor:
Harry C. Wendt,
by. Richard C. Horley
His Attorney

Aug. 6, 1957 H. C. WENDT 2,801,542
GYRO SETTING APPARATUS
Filed Oct. 29, 1954 4 Sheets-Sheet 2

Inventor:
Harry C. Wendt
by. Richard E. Horley
His Attorney

Aug. 6, 1957 H. C. WENDT 2,801,542
GYRO SETTING APPARATUS
Filed Oct. 29, 1954 4 Sheets-Sheet 3

Inventor:
Harry C. Wendt
by. Richard E. Harley
His Attorney

Aug. 6, 1957

H. C. WENDT 2,801,542

GYRO SETTING APPARATUS

Filed Oct. 29, 1954

Inventor:
Harry C. Wendt
by. Richard C. Horley
His Attorney

United States Patent Office 2,801,542
Patented Aug. 6, 1957

2,801,542

GYRO SETTING APPARATUS

Harry C. Wendt, Lynn, Mass., assignor to General Electric Company, a corporation of New York Application October 29, 1954, Serial No. 465,523

19 Claims. (Cl. 74—5.4)

The present invention relates to gyroscopes and, more particularly, to gyroscopic apparatus which is brought into proper operating conditions by automatic means.

Conventional directional gyroscopes and gyro verticals used as reference instruments are of the three-axis type, that is, in addition to the spin axis of the rotor structure, there is a minor axis of suspension of the rotor in a main gimbal, and a major axis of suspension of the main gimbal in an outer frame. The major and minor pivot axes are fixed at right angles to one another, and, in normal operation, the rotor spin axis may be perpendicular to both of these fixed axes. One of the long-standing problems in connection with such gyroscopes has been that of rapidly and accurately orienting the main gimbal about the major axis and the spin axis about the minor suspension axis; and it is obviously necessary that such orientations be accomplished before a gyro instrument can be put to use after being started or after it has drifted into seriously erroneous attitudes. Commonly, mechanical caging apparatus has been employed to force the gyro elements to pre-set positions, with either direct manual or indirect electrical actuation of the caging members. Also, it has been proposed to set gyros somewhat automatically through use of torque motors, although it has not been possible to accomplish such setting with satisfactory ease and speed while the gyro rotors are running at high speed. In accordance with teachings of the present invention, however, complex mechanical caging arm and lever arrays are not required to be forced into contact with gyroscopes to orient them properly, and setting may be achieved at any time with rotors spinning at full speed. Further, automatic gyro setting may be realized with great precision and rapidity, and the operations may be controlled from remote locations.

Precessions of gyro rotor structures about their minor axes are readily accomplished, with the rotors spinning, through the application of torques about the major gyro axes, and high rates of such precessions can be realized with electromagnetic torque motors which are effective about the major gyro axes. Inasmuch as torque motors for occasioning such precessions are mounted largely on the outer frames of gyroscopes they may be made of any size necessary to exert the torques required for high precession rates. Accordingly, this invention advantageously involves positioning or setting of the rotor structure spin axis of a gyroscope through certain major axis torque-applying devices. However, rapid orientations of the main gimbals of gyroscopes about their major axes are difficult to achieve with torque motors. If suitably powerful and large torque motors are used about the minor axes, to yield these precessions sought about the major axes, the increased bearing frictions, inertias, and balance problems become intolerable. In connection with this general matter, it should be recognized that the gyroscopic inertias developed to oppose movements of the rotor structures about both the major and minor axes are of very considerable magnitudes, and the severe loads which torque motors would be required to withstand and the large torques they would be required to develop to precess the gyro members into predetermined positions would demand that these motors be too large and weighty and consume inordinate amounts of electrical current. Although one torque motor may be used, operating about the major axis in the manner described hereinabove, a second torque motor operating about the minor gyro axis would increase the loads on the one motor because torques would be reflected from one motor to the other. It is for such reasons that prior torque motor setting arrangements have been used only when the gyro rotors are not running or are running very slowly, the effects of precessions then being absent. By way of distinction, the present teachings are of setting arrangements utilizing only the one torque motor device effective about a major gyro axis, that single torque device serving to orient the rotor structure about both the major and minor gyro axes. Such dual functioning of the single torque motor is brought about by its cooperative relation to high-angle gimbal stops which are affixed to the gyroscope. In setting a gyroscope, torque is first applied about the major gyro axis, whereupon the rotor structure precesses about the minor axis until the gimbal stops engage. Upon engagement of the stops, gyroscopic rigidity about the major axis is lost, and further application of torque in the same angular direction about the major axis easily causes the main gimbal to rotate. As soon as the desired angular orientation of the main gimbal about the major axis is reached, a reverse torque is applied about the major axis, and the rotor structure precesses away from the stop-engaged position. The last precession occasions restoration of gyroscopic rigidity about the major axis, such that the main gimbal retains the desired angular orientation, and the reverse torque is maintained only until the rotor structure reaches a desired angular position about the minor axis. At that time, torque about the major axis is wholly removed, and the gyroscope then possesses proper settings about both its major and minor axes. Not only does this invention obviate the need for special minor axis torque motors to achieve setting about major axes, but suitable major-axis torque-applying devices need not even overcome gyroscopic rigidity in accomplishing fast setting about the major gyro axes.

One object of the present invention is to provide novel and improved gyroscopic apparatus which may be set with great accuracy and rapidity.

Another object is to provide a novel and improved method for setting gyroscopes.

Further, it is an object to provide gyroscopic apparatus wherein a single torque-applying arrangement cooperates with gimbal stops to accomplish improved setting.

By way of a summary account of one aspect of this invention, a directional gyroscope embodiment of gyroscopic apparatus is equipped with mechanical stops which limit relative angular movement of its rotor structure and main gimbal about its normally horizontal minor gyro axis. These stops are positioned such that they will ordinarily engage only when the gyroscope assumes abnormal attitudes, in the well known manner. Further, the directional gyroscope is equipped with a major axis torque-applying arrangement, a minor axis electrical pick-off, and a levelling amplifier excited by the pick-off output signals and delivering power output signals to the torque-applying arrangement. When it is desired to set the gyroscope to any azimuth heading and also to a levelled condition, switching apparatus is used to connect the torque-applying arrangement with a suitable power source, at which occurrence the rotor structure immediately precesses about the minor axis until the stops are struck. Once the stops engage, gyroscopic rigidity about the major gyro axis is lost, and the torque-applying arrangement drives the main gimbal around freely. The observer then waits momentarily until the azimuth card or dial reaches the desired heading, and then disconnects the power source from the torque arrangement, by means of the switching apparatus, at the same time coupling the output of the levelling amplifier to the torque-applying arrangement, with the same switching apparatus. Because the gyro rotor structure is tilted away from the level condition at that instant, the sensing minor axis pick-off will excite the levelling amplifier in a sense which causes characteristic amplifier output signals to be produced. These amplifier output signals so excite the torque-applying arrangement that it precesses the rotor structure toward the levelled condition, and this action continues automatically until the levelled condition is reached and the minor axis pick-off delivers no output signals.

Although the features of this invention which are believed to be novel are set forth in the appended claims, the details of preferred embodiments and further objects and advantages may be most readily comprehended through reference to the following description taken in connection with the accompanying drawings, wherein:

Figure 1:
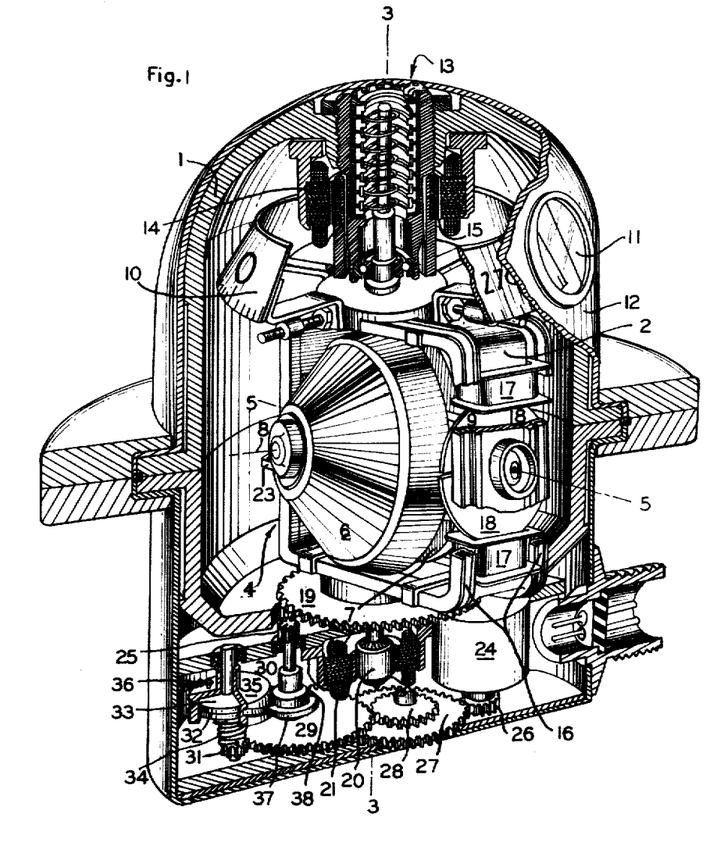
Figure 1 illustrates a partly-sectionalized directional gyroscope constructed in conformity with teachings of this invention.

The apparatus shown in Figure 1 will be recognized as including a directional gyroscope of the three-axis type. In this connection, the outer frame member 1 is observed to support a main gimbal 2 for pivotal movement about a normally vertical major suspension axis 3—3, and the main gimbal in turn pivotally supports a rotor structure 4 for pivotal movement about a normally horizontal minor suspension axis 5—5. Twin symmetrical rotor halves 6 and 7 of the rotor structure 4 revolve at high speed about the spin axis 8, the rotors being supported by a flat plate 9 passing between them and pivoted in the main gimbal 2. Rotor structures of this type are disclosed in my copending application S. N. 325,577, filed December 12, 1952, for "Symmetrical Gyroscope," now Patent No. 2,731,836, assigned to the same assignee as that of the present application. An azimuth card 10 is affixed to main gimbal 2, providing an indication of the compass heading when viewed through the window 11 of the outer housing 12 of the entire assembly. A spiral brush assembly 13 electrically couples the movable gyroscope elements with stationary circuit elements, the brush assembly being like that of the copending application of Harry G. Swanson, S. N. 329,075, filed December 31, 1952, for "Gyro Slip Ring Structure," now Patent No. 2,766,625, assigned to the same assignee as that of the present application. For the purpose of applying relatively low torques about the major axis 3—3 to accomplish normal levelling precession of rotor structure 4 about the minor axis 5—5, there is provided an electromagnetic torque motor comprised of a stator 14, attached to the outer frame 1, and a rotor 15, fixed with the main gimbal 2. Levelling errors or tilts of the rotor structure 4 about the minor axis 5—5 are detected by the minor axis pick-off arrangement comprising rotor structure 4 and windings 16 mounted on main gimbal 2. As is taught in my copending application S. N. 331,096, filed January 13, 1953, for "Gyro Pick-Off," now Patent No. 2,737,054, assigned to the same assignee as that of the present application, the leakage flux from rotor structure 4 will induce output signals in windings 16 which characterize tilts of the rotor structure from its normal position. When the pick-off signals are applied to a suitable levelling amplifier of the conventional type, and the amplifier output signals are fed to the stator 14 of the major axis torque motor, then the gyro rotor structure 4 will be automatically maintained in a predetermined relation to the main gimbal. Such small torques as may be required about the minor axis 5—5 for the purpose of precessing the main gimbal 2 into slaved azimuth correspondence with a magnetic compass or other earth's field detector may be applied by the torque motor comprising windings 17 on the main gimbal 2 cooperating with semicircular magnets 18 fixed with the rotor structure 4. Further apparatus associated with the gyroscope includes a main gimbal gear 19 and a major axis electrical pick-off which has a rotor 20 fixed with the main gimbal and a stator 21 fixed in relation to the outer frame 1.

To the directional gyroscope assembly described thus far there is added a major-axis torque-applying means which is capable of exerting sizable torques about the major gyro axis and which may be selectively coupled with and uncoupled from the gyroscope. Further, gimbal stops are provided to limit relative angular movements permissible between the rotor structure 4 and the main gimbal 2. Such stops may take the form of a pin 22 projecting from the rotor structure plate 9 and a pair of stop arms 23 (see Figure 4) fixed with the main gimbal 2, and, preferably, the stops limit relative angular freedom of the rotor structure and main gimbal to between 160 and 180 degrees, such that gimbal lock conditions are just avoided. High-angle stops of this type not only preclude the occurrence of gimbal lock, but also insure that ambiguities in orientations of the main gimbal will be avoided, despite violent maneuvering of the instrument, as is taught in the copending application of Allen T. Sinks, S. N. 594,628, filed May 19, 1945, for "Gyroscope," now Patent No. 2,730,813, assigned to the same assignee as that of the present invention.

The above-mentioned torque-applying means is illustrated in Figure 1 as comprising apparatus of the type disclosed in the copending application of Harry G. Swanson, S. N. 471,352, filed November 26, 1954, for "Gyro Setting Device," now Patent No. 2,737,053, assigned to the same assignee as that of the present application. The electric motor component 24 there functions to apply a torque to the pinion 25, the mechanical power flow being traced from motor 24 through gears 26, 27, 28, and 29, and the keyed vertically-slidable shaft 30. Pinion 25 remains out of engagement with the main gimbal gear 19 as long as motor 24 is unenergized, whereby the frictions and inertias of the torque-applying mechanism do not interfere with normal operation of the precision gyroscope assembly. Upon excitation of motor 24 at the commencement of a setting operation, the gear 29 is caused to drive the further gear 31 which is coupled with a clutch disk 32. That clutch disk is biased against a second clutch member 33 by spring 34, the member 33 being fixed with an externally-grooved cam 35. Spring 36 prevents cam 35 from turning more than about 180 degrees, at which point slippage is permitted to occur between clutch members 32 and 33 while the cam remains stationary. The half turn of cam 35 causes tongue 37 on the sleeve member 38 to be raised, the sleeve member rising with the tongue 37 and carrying the pinion shaft 30 upwardly with it such that pinion 25 engages the main gimbal gear 19.

Immediately upon engagement of pinion 25 with gimbal gear 19 a torque is impressed about the major gyro axis 3—3. Thereupon, the gyroscope is precessed about its minor axis, reoriented in azimuth, and levelled again, in a manner described hereinafter. Withdrawal of excitation from motor 24 relieves the torque-applying apparatus of torque, and return spring 36 then turns cam 35 back to its original position. This turning movement forces tongue 37 in a downward direction, whereby pinion 25, which moves axially with the tongue, is disengaged from main gimbal gear 19.

Figure 2:
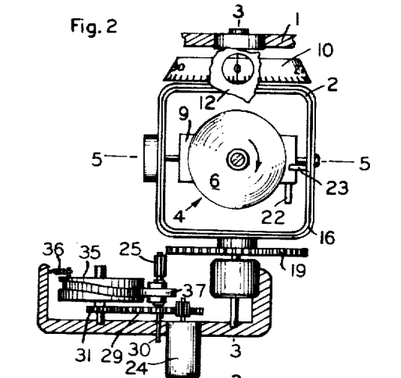
Figures 2 through 6 represent successive stages of operation of the apparatus of Figure 1 as it is caused to undergo a complete setting, with the apparatus portrayed in simplified form.
Figure 3:
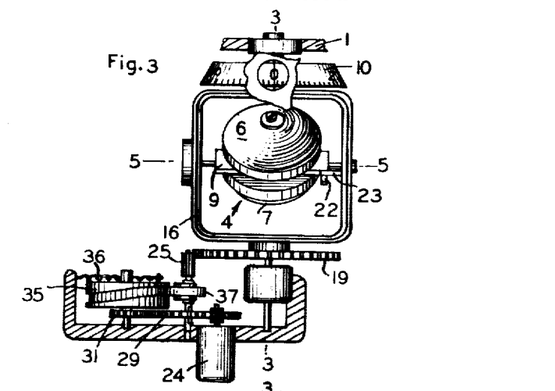
Figure 4:
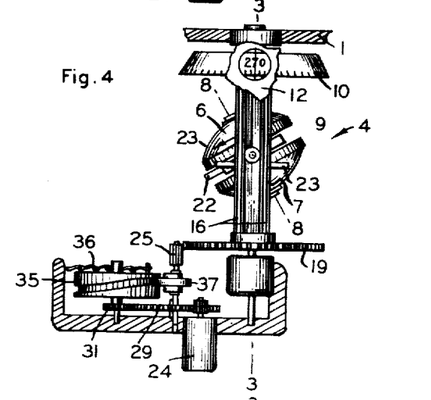

Operating effects of the torque-applying apparatus are best perceived through reference to the simplified showings of the gyroscope in Figures 2 through 6, parts there being identified by the same reference characters employed to designate corresponding parts in the gyroscope of Figure 1. In Figure 2, for example, the apparatus is shown under normal conditions when setting is not being accomplished, the torque pinion 25 remaining out of engagement with gimbal gear 19. Figure 3 illustrates one of the first results of the excitation of torque motor 24. The pinion 25 has there been raised into engagement with gimbal gear 19, the motor 24 having been stalled and the cam 35 having been rotated 180 degrees against its restraining spring 36 to urge the tongue 37 and pinion 25 into the raised position illustrated. Of prime importance, the torque impressed about the major axis 3—3 by motor 24 through pinion 25 has caused precession of rotor structure 4 about the minor axis 5—5, and, as shown in Figure 3, the rotor structure stop pin 22 has just engaged the main gimbal stop arm 23 as the result of such precession. Gyroscopic rigidity of main gimbal 2 is lost when the stop members are thus engaged, whereupon the motor 24 is effective to rotate the main gimbal 2 about major axis 3—3, through pinion 25 and gimbal gear 19, without appreciable restraint. As the main gimbal is turned in this manner, the cam 35 of course remains stationary, its internal clutch mechanism merely slipping at such times. The view in Figure 4 represents the result of this further action, and it can be perceived that the main gimbal 2 has been turned about 90 degrees, from an initail compass card reading of 0 degree to a final reading of 270 degrees.

Figure 5:
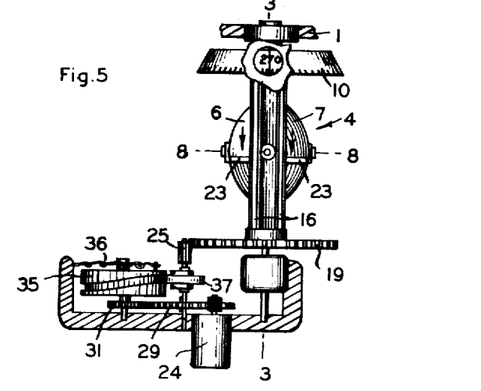
Figure 6:
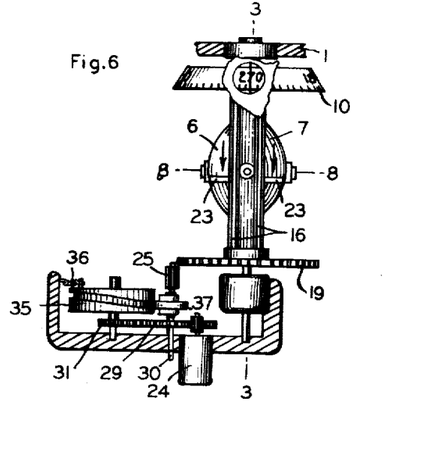

As soon as the desired azimuth heading is reached, the excitation of torque motor 24 is reversed, to cause a reversal of the torque impressed about major gyro axis 3—3. Instantly the pinion 25 is withdrawn, cam 35 is turned about 360 degrees, and pinion 25 is then reengaged with gimbal gear 19. Torque opposite to that originally exerted upon the main gimbal 2 is then experienced, whereupon the rapid precession of rotor structure 4 is in a direction whch separates the stop members 22 and 23. Disengagement of these stop members occasions restoration of gyroscopic rigidity about the major gyro axis 3—3, and that gimbal thereafter preserves the set azimuth accurately. Figure 5 illustrates the rotor structure 4 as it is precessed to the levelled condition. Finally, excitation of torque motor 24 is withdrawn entirely, and cam 35 is moved about one-half turn by restraining spring 36, thereby retracting pinion 25 such that it leaves the gimbal gear 19 free. As depicted in Figure 6, the gyroscope is fully set, both in azimuth and condition of levelling, and is readied for control or reference purposes of the usual type.

Figure 7:
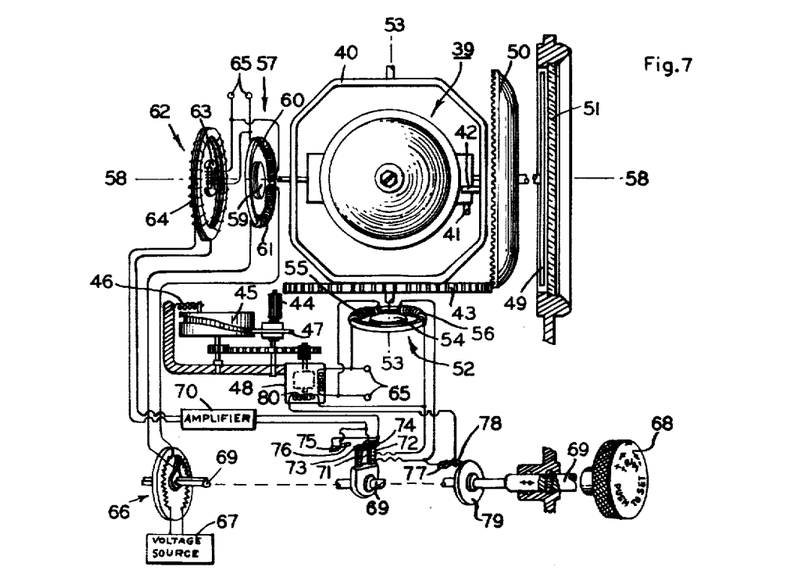
Figure 7 depicts a directional gyroscope including electrical setting components.

Figure 7 presents a direct-indicating directional gyroscope instrument having provisions for the automatic levelling of the gyro rotor structure 39 thereof. In construction and function the main gimbal 40, gimbal stop members 41 and 42, gimbal gear 43, pinion 44, cam 45, return spring 46, tongue 47, and torque motor 48 are similar to the corresponding parts of the gyroscope illustrated in Figures 1–6. This embodiment differs somewhat in the azibuth display, however, which is by way of an azimuth dial 49 actuated by the conventional cupgear 50 and viewed through a flange-mounted window 51. A relatively low-torque major axis torque motor 52 is employed about the major axis 53—53, including the usual rotor 54 and two-phase stator windings 55 and 56, and a relatively low-torque minor axis torque motor 57 is employed about the minor axis 58—58, including the usual rotor 59 and two-phase stator windings 60 and 61. Two-phase pick-off 62 is also positioned about minor axis 58—58, and comprises a rotor member 63 and wound stator 64. Excitation for pick-off rotor 63, minor axis torque motor 57, and major axis torque motor 52 is had from the two sets of terminals 65. Additional excitation for minor axis torque motor 57 supplied by the tapped adjustable potentiometer 66 energized by voltage source 67 permits adjustable precession about the major axis to compensate for small azimuth errors and to introduce latitude correction for known purposes.

Knob 68 and its attached shaft 69 are manually controlled to accomplish the angular positioning of potentiometer 66 and to initiate and terminate the gyro setting. When knob 68 is pulled out, or moved to the right in the illustration in Figure 7, the gyroscope is in condition to operate normally. The circuit couplings shown are those which are realized under such normal conditions. It may be perceived, for example, that the major axis torque motor 52 is being excited by such output signals as the levelling amplifier 70 may deliver to it in response to signals provided by minor axis pick-off 62 whenever the gyro rotor structure 39 tilts from its null position. The coupling of amplifier output signals with torque motor 52 is by way of movable switch arms 71 and 72 which connect with contacts 73 and 74, respectively, the latter contacts being stationary and the switch arms 71 and 72 moving only axially with shaft 69 and knob 68. Thus, torque motor 52 normally operates to precess the rotor structure 39 to a levelled position, at a relatively slow rate.

When it is desired to set the instrument of Figure 7 to a new azimuth position, knob 68 is pushed in, or to the left as shown in the drawing. Thereupon, switch arms 71 and 72 are then engaged with switch contacts 75 and 76, respectively, these contacts being coupled with contacts 74 and 73, respectively, such that the polarity of the amplifier output signals is reversed when applied to torque motor 52 through contacts 75 and 76. At the same time, the contacts 77 and 78 are connected by the moved switch member 79, which is mounted on shaft 69, causing excitation of winding 80 of the torque motor 48 by the output of amplifier 70 to which the winding 80 is then coupled. It will be appreciated that, because rotor 39 is almost never in an exactly levelled condition for any appreciable length of time, the amplifier 70 will be almost continuously excited by pick-off 62 to deliver output signals and thus it can be reliably expected that the torque motor 48 will be operated when knob 68 is pushed.

Both torque motor 52 and torque motor 48 are effective to apply torque about major gyro axis 53—53 when simultaneously excited as the result of the pushing of knob 68 to its rearmost position. The torque applied by motor 48 through pinion 44 in the manner described hereinbefore is of course larger, however. Rotor structure 39 then tilts until the stops 41 and 42 engage, and subsequently turns freely in azimuth. The operator need only observe when the azimuth dial 49 reaches the desired orientation, then pull knob 68 to its outer position. Upon the last occurence, switch member 79 pulls away from contacts 77 and 78 to deenergize the torque motor 48, and switch arms 71 and 72 are pulled into engagement with contacts 73 and 74. De-energizing of motor 48 results in a withdrawal of pinion 44 from gimbal gear 43, such that the main gimbal 40 is freed, and the movement of switch arms 73 and 74 results in the application of reversed-polarity signals to the torque motor 52. Torque motor 52 then applies major axis torque which causes precession of the stops 41 and 42 away from one another, whereupon gyroscopic rigidity of the main gimbal 40 is immediately restored and the azimuth setting preserved. This precession continues until the rotor structure 39 is levelled, and the setting operation is then completed. All that has been required of the operator is that he press in knob 68 for a few seconds until the desired azimuth heading is read on the dial, and then pull the knob out once more. The latter operation can, of course, be performed by a simple return spring, such that the operator need only release the knob when the wanted azimuth heading is read.

Figure 8:
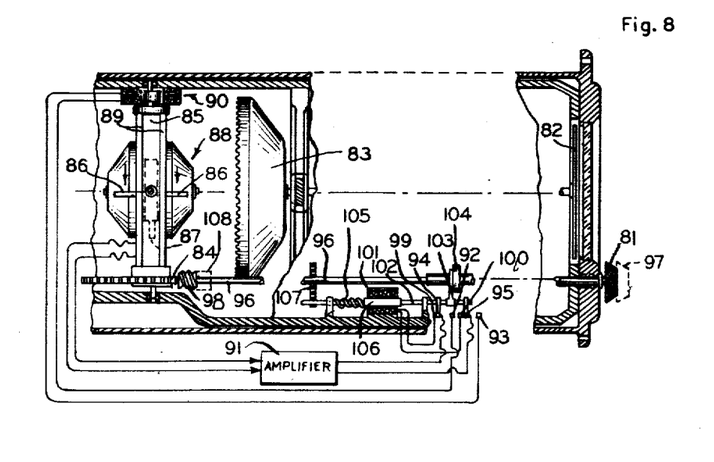
Figure 8 illustrates a modified directional gyroscope embodiment of the invention wherein azimuth setting is accomplished manually.

In Figure 8, there is illustrated a directional gyroscope which is set in accordance with my teachings but in which fast azimuth re-orientations are accomplished through further manipulations of the setting knob 81. Like the instrument of Figure 7, this gyroscope includes an azimuth dial 82, driven by a cup gear 83, the latter being meshed with a main gimbal gear 84 attached to the main gimbal 85. Gimbal stops 86 and 87 are provided between the main gimbal 85 and the rotor structure 88. Pick-off windings 89 are mounted on main gimbal 85 to detect tilt between that gimbal and rotor structure 88, in the manner of the corresponding pick-off windings of Figure 1, and a major axis torque motor 90 is utilized also. Output of the windings 89 energizes a levelling amplifier 91 which normally controls torque motor 90 in the usual manner to achieve levelling of the rotor structure 88. Coupling of the amplifier output with torque motor 90 is through contacts 92 and 93 which engage movable contacts 94 and 95, respectively, when the knob shaft 96 to which the latter contacts are attached is moved to the right by the pulling of knob 81 to the outermost position shown by dashed lines 97.

When setting of the instrument of Figure 8 is to be accomplished, knob 81 is pressed in to the location illustrated, carrying the attached shaft 96 inwardly with it. This action causes the worm gear 98, which is fixed with shaft 96, to engage the main gimbal gear 84, and also causes the movable contacts 94 and 95 to be engaged with the contacts 99 and 100, respectively, leading to the solenoid winding 101. Contacts 94 and 95 move in the proper manner by virtue of their insulated connection with solenoid shaft 102, which is in turn connected with an arm 103 sleeved on knob shaft 96. The fixed shoulder 104 on knob shaft 96 functions to press sleeved arm 103 to the rear, to make the aforesaid connections, although it does not act to pull sleeved arm 103 forward with it when knob 97 is pulled out to the dashed-line position 97. A spring 105 urges solenoid plunger 106 and its shaft 99 in the forward direction which tends to close movable contacts 94 and 95 with the torque motor contacts 92 and 93 when knob 81 is not pressed in. An additional constructional feature is the provision of a spiral spring 107 which has one end connected with the knob shaft 96 and a free end disposed to stop against the rear end of shaft 102, which functions as an interference or stop member.

The initial inward pressing of knob 81 not only engages gears 98 and 84 as well as coupling the levelling amplifier output with solenoid winding 101, but also causes stressing of the solenoid spring 105 and moves the solenoid shaft 102 to a position at which its rear end serves as a stop for spiral spring 107. Knob 81 is then rotated. The torque applied about the major gyro axis by this rotative movement of knob 81 and its worm gear 98 causes the rotor structure to precess about the minor gyro axis until the stops 86 and 87 are struck, whereupon the main gimbal 85 loses gyroscopic rigidity and turns freely about the major axis as long as the knob 81 is rotated. Spring 107 winds up during this process. When the desired azimuth heading is indicated by dial 82, knob 81 is released by the operator. Knob 81 remains in the rear position for a certain time, however, because the amplifier 91 has excited solenoid winding 101 to hold the spring 105 in a stressed condition. This action is assured inasmuch as the pickoff windings 89 will always excite the amplifier 91 to deliver an output as long as the rotor structure is tilted toward the stop-engaged positions. Levelling of rotor structure 88 and return to normal operating conditions next occur automatically. Because levelling spring 107 had been wound up during the setting interval, it now applies reverse torque about the major gyro axis, through worm gear 98. That reverse torque precesses rotor structure 88 away from the stop-engaged position and finally results in levelling of the rotor structure. It will be appreciated that no actual rotation of knob shaft 96 and worm gear 98 takes place during the reverse-torque precession interval, so the azimuth setting of main gimbal 85 remains undisturbed. As soon as the levelled condition is reached, pick-off windings 89 yield no output, amplifier 91 then yields no output signal, and solenoid winding 101 is de-energized. Instantly, solenoid spring 105 forces the solenoid shaft 102 forward, whereby the attached arm 103 presses the knob shaft 96 forward by way of its shoulder 104. As knob shaft 96 moves forward, its worm gear 98 is moved to the dashed line position 108, wherein it is disengaged from the main gimbal gear 84. Spiral spring 107 then unwinds. Forward movement of the solenoid shaft 102 closes movable contacts 94 and 95 with levelling torque motor contacts 92 and 93, such that the gyroscope is thereafter continuously levelled in the usual manner. The operator's task has been merely to press in knob 81, rotate it until the sought azimuth reading is realized, and then release it.

Figure 9:
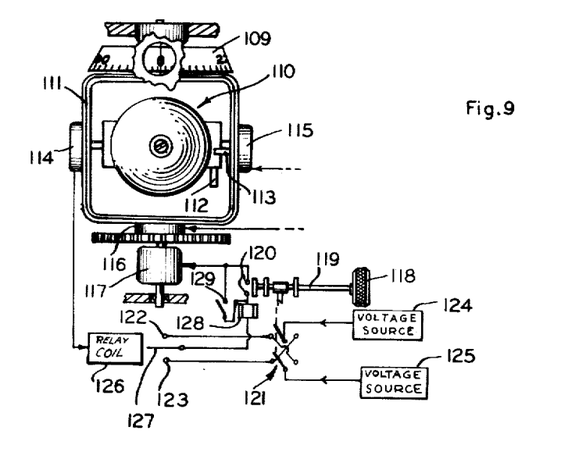
Figure 9 shows alternative mechanism and circuitry for practising the teachings of this invention.

Although it is preferable to utilize major-axis torque-applying means which may be wholly disengaged from the main gimbal, in the interest of minimizing torques about that axis during normal operating intervals, my invention may employ conventional major axis torque motors where their residual torques and inertias are not excessively large or where the greatest possible long-period gyro accuracies are not demanded. Figure 9 depicts a simple gyroscopic instrument arrangement of this type, which also includes circuitry of an alternative form usable with other embodiments of this invention. The directional gyroscope there shown includes the customary azimuth indicator 109, rotor structure 110, main gimbal 111, stops 112 and 113, and minor axis pick-off 114. A minor axis torque motor 115 and major axis pick-off 116 may also be provided for azimuth slaving with an earth's field detector. Fast setting and levelling are achieved through the major axis torque motor 117, which is preferably a high-torque device, and which may be of a conventional motor construction having a rotor coupled with the vertical major gimbal shaft and a stator fixed in relation to the outer instrument frame.

Setting and levelling operations are initiated by pressing knob 118 inwardly. The resulting movement of knob shaft 119 closes contacts 120 and, through double-throw reversing switch 121, couples relay contacts 122 and 123 with the oppositely-phased voltage sources 124 and 125, respectively. Pick-off 114 will deliver output signals to the polarized relay coil 126 which will actuate the relay armature 127 into switching connection with one or the other of contacts 122 and 123, whereby current from one or the other of sources 124 and 125 will flow to torque motor 117 through holding relay coil 128 and closed contacts 120. Holding relay coil 128 then closes its contacts 129 to preserve current flow to the torque motor 117 irrespective of the positioning of knob 118. Torque motor 117 then operates to precess rotor structure 110 to a stop-engaged position and thereafter freely rotates the main gimbal 111 about the major axis. As soon as the correct azimuth heading is realized, knob 118 is pulled out, such that switch 121 thereafter applies the voltage of a different one of the sources 124 and 125 to the torque motor 117. Gyroscopic rigidity is restored by the rotor structure precession away from the stop-engaged position which results from the reversed major axis torque occasioned by reversal of the phasing of voltage applied to motor 117. Azimuth heading is preserved while the rotor structure 110 continues to precess to a level position. Once the levelled condition occurs, relay coil 126 senses no output from pick-off 114, whereupon relay armature 127 drops out to a non-contacting position, holding relay contacts 129 open, and torque motor 117 is de-energized. The gyroscope is then fully set and levelled, it having been necessary only to press in knob 118 until the azimuth heading appears on the indicator 109 and to pull it out again at that time.

Figure 10:
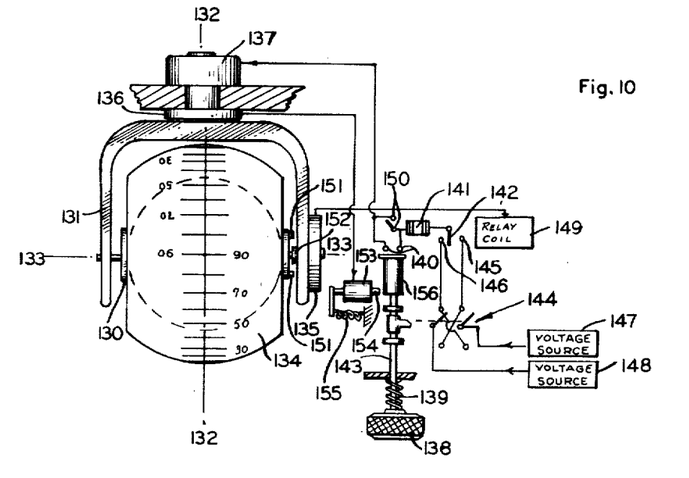
Figure 10 represents an embodiment of my unique setting arrangement in a gyro vertical instrument.

Gyro verticals are equally well set about both major and minor axes in accordance with these teachings, and one arrangement for the setting of such an instrument is depicted in Figure 10. Rotor structure 130 of the gyro vertical is normally oriented with its spin axis substantially vertical, or slightly tipped from the vertical for certain compensation purposes. The supporting main gimbal 131 is pivotally mounted in an outer frame about the normally horizontal major axis 132—132, the minor support axis 133—133 also being normally horizontal. Dive and climb and bank indications are afforded by a substantially spherical indicator 134 surrounding the rotor structure, in this embodiment. Two electrical pick-offs are used, one, 135, about the minor gyro axis, and the other, 136, about the major gyro axis. The major axis torque motor 137, which aids in accomplishing the setting, is illustrated as being of the conventional motor type, similar to motor 117 in the apparatus of Figure 9.

To initiate setting, knob 138 is pressed in against the force of its return spring 139, thereby closing the contacts 140 which are in series with the major axis torque motor 137 and with holding relay coil 141 and relay armature 142. The movement of knob shaft 143 occasioned by movement of knob 138 also actuates the double-throw reversing switch 144, and relay contacts 145 and 146 are thus energized with voltages from oppositely-phased voltage sources 147 and 148. Depending upon the phase of output voltage impressed upon the relay coil 149 by minor axis pick-off 135, the relay armature 142 will contact one or the other of contacts 145 and 146, to complete excitation of the major axis torque motor 137. Current flow to motor 137 causes holding relay contacts 150 to close and remain so closed, shunting contacts 140 until torque motor excitation ceases at a later time. The ensuing major axis torque causes rotor structure 130 to precess about minor axis 133—133 until stops 151 and 152 are engaged, and the main gimbal 131 then turns freely about the major axis 132—132 until it reaches a pre-set orientation about that axis. At that orientation, the major axis pick-off 136 ceases to yield the outputs which it did earlier at other orientations. Those earlier outputs caused solenoid 153 to move its shaft 154 against force of spring 155 into holding engagement with knob shaft shoulder 156, thereby retaining knob shaft 143 in its forward position. When output of major axis pick-off 136 ceases, solenoid 153 is de-energized and its shaft 154 is retracted by spring 155 such that shoulder 156 of knob shaft 143 is unlatched. Knob shaft 143 is sprung back by its spring 139, such that double-throw switch 144 then couples another one of voltage sources 147 and 148 with major axis torque motor 137. The reversed-polarity voltage thus applied to torque motor 137 results in reversed torque which frees the stops 151 and 152, restores gyroscopic rigidity of the main gimbal, and precesses the rotor structure 130 about minor axis 133—133 toward the position at which it is to be set. Once that latter position is reached, minor axis pick-off 135 yields no output, relay coil 149 is de-energized, relay armature 142 moves to a neutral position, holding relay contacts 150 drop out, and major axis torque motor 137 is de-energized. At that time the gyroscope is fully set about both its major and minor axes, and the operator has merely been required to push in the knob or button 138. In some types of gyroscopes, where the settings are to be varied from time to time or where the settings about both axes are to be referred to the vertical as detected by other devices, these reference devices may be used to actuate further pick-offs, the outputs of which are inserted between pick-off 136 and solenoid winding 153 and between pick-off 135 and relay coil 149. The final settings of the gyro axes will then be different from those which obtain from the arrangement of Figure 10, that latter arrangement serving only to orient the gyro axes with reference to the outer casing of the instrument.

The specific embodiments of the invention herein disclosed are, of course, of a descriptive rather than a limiting nature, and various changes, combinations, substitutions or modifications may be employed in accordance with these teachings without departing either in spirit or scope from this invention in its broader aspects.

What I claim as new and desire to secure by Letters Patent of the United States is:

1. The method for setting a gyroscope which has stop means which engage to limit its freedom about the minor gyro axis which comprises first applying a torque in one direction about the major gyro axis to cause, successively, precession of the gyroscope about the minor gyro axis until said stop means engage to eliminate gyroscopic rigidity about said major axis, and turning of the gyroscope about said major axis to a preselected orientation, and then applying a torque about said major axis in the opposite direction to cause precession about said minor axis until said gyroscope reaches a preselected orientation about said minor axis.

2. The method for setting a gyroscope which has means which interrupt gyroscopic rigidity about the major gyro axis when predetermined limits of relative freedom about the minor axis are exceeded which comprises first applying a torque in one direction about said major axis to cause, successively, precession about said minor axis until said gyroscopic rigidity is interrupted, and turning of the gyroscope about said major axis to a preselected orientation, and then applying a torque about said major axis in the opposite direction to cause precession about said minor axis which restores gyroscopic rigidity about said major axis.

3. The method for setting a gyroscope which loses gyroscopic rigidity about the major suspension axis thereof when the rotor spin axis thereof is in a predetermined relationship with said major axis which method comprises first applying a torque in one direction about said major axis until gyroscopic rigidity is lost by precession of the gyroscope about the minor axis thereof such that said spin axis and major axis are in said predetermined relationship, next continuing to apply torque in said direction about said major axis until the gyroscope reaches a preselected orientation about said major axis, and then applying torque in the reverse direction about said major axis until the gyroscope precesses to a preselected orientation about said minor axis.

4. The method for setting a directional gyroscope which loses gyroscopic rigidity about the major suspension axis thereof when the rotor spin axis thereof is in a predetermined relationship with said major axis which method comprises first applying a torque in one direction about the normally vertical major axis until gyroscopic rigidity about that axis is lost by precession of the gyroscope about the normally horizontal minor axis thereof such that said spin axis and major axis are in said predetermined relationship, next continuing to apply torque in said direction about said major axis until the gyroscope reaches a predetermined azimuth orientation about said major axis, and then applying torque in the reverse direction about said major axis until the gyroscope precesses to a predetermined levelling orientation about said minor axis.

5. The method for setting a gyro vertical which loses gyroscopic rigidity about the major suspension axis thereof when the rotor spin axis thereof is in a predetermined relationship with said major axis which comprises first applying a torque in one direction about the normally horizontal major axis until the gyro precesses about its normally horizontal minor axis to a position at which said spin axis and major axis are in said predetermined relationship and gyroscopic rigidity about said major axis is lost, next continuing to apply torque in said direction about said major axis until said gyro reaches a predetermined bank orientation about said major axis, and then applying a torque about said major axis in the reverse direction until said gyro precesses to a predetermined dive-and-climb orientation about said minor axis.

6. Gyroscopic apparatus comprising a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, torque means for applying torques about said major axis in two angular directions, means for energizing said torque means to apply torque in said two directions about said major axis, and setting control means for first coupling said energizing means with said torque means to occasion torque about said major axis in one of said directions, whereby to cause precession of said rotor structure about said minor axis until said gyroscopic rigidity is interrupted and to cause subsequent turning of said gimbal about said major axis, and for next coupling said energizing means with said torque means to occasion torque about said major axis in the other of said directions, whereby to restore said gyroscopic rigidity.

7. Gyroscopic apparatus comprising a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, means for applying torque in one direction about said major axis first to cause said rotor structure to precess about said minor axis until said gyroscopic rigidity is interrupted and then to cause said gimbal to move about said major axis, means for reversing the direction of the torque applied by said torque-applying means after said gimbal reaches a predetermined orientation about said major axis, and means for interrupting the operation of said torque-applying means when said rotor structure is precessed to restore gyroscopic rigidity about said major axis by torque of said reverse direction from said torque-applying means.

8. Gyroscopic apparatus comprising a gimbal supported for movement about a major axis, a gyro rotor structure suspended by said gimbal for angular displacement in relation to said gimbal about a minor axis normal to said major axis, stop means limiting relative angular movement between said gyro rotor structure and said gimbal about said minor axis to less than 180 degrees, means for applying torque in one direction about said major axis first to cause said rotor structure to precess to a limit of said relative displacement and then to cause said gimbal to move about said major axis, means for reversing the direction of the torque applied by said torque-applying means after said gimbal reaches a predetermined orientation about said major axis, and means for interrupting the operation of said torque-applying means when said rotor structure is precessed to a predetermined orientation about said minor axis by torque of said reversed direction from said torque-applying means.

9. Gyroscopic apparatus comprising a gimbal supported for movement about a major axis, a gyro rotor structure suspended by said gimbal for angular displacement in relation to said gimbal about a minor axis normal to said major axis, means interrupting gyroscopic rigidity about said major axis when predetermined relative displacements between said gimbal and rotor structure about said minor axis are exceeded, means for applying torque about said major gyro axis, means sensing relative displacements between said gimbal and rotor structure from a predetermined orientation about said minor axis, means for actuating said torque-applying means to apply torque in one of said directions about said major axis, whereby to cause precession of said rotor structure about said minor axis until said gyroscopic rigidity is interrupted and to cause subsequent turning of said gimbal about said major axis, and means responsive to said sensing means for actuating said torque-applying means to apply torque in the other of said directions about said major axis, whereby said rotor structure precesses to restore said gyroscopic rigidity.

10. Gyroscopic apparatus comprising a gimbal supported for movement about a major axis, a gyro rotor structure suspended by said gimbal for relative displacement in relation to said gimbal about a minor axis normal to said major axis, means interrupting gyroscopic rigidity about said major axis when predetermined relative displacements between said gimbal and rotor structure about said minor axis are exceeded, means for applying torque about said major gyro axis, and means for sequentially actuating said torque-applying means first to apply a torque about said major axis in one direction, second to apply a torque about said major axis in the opposite direction, and then to interrupt torque about said major axis from said torque-applying means, whereby said rotor structure first precesses until said gyroscopic rigidity is interrupted, then turns with said gimbal about said major axis, and then precesses in the opposite sense to restore gyroscopic rigidity.

11. Gyroscopic apparatus comprising a gimbal supported for movement about a major axis, a gyro rotor structure suspended by said gimbal for relative displacement in relation to said gimbal about a minor axis normal to said major axis, means interrupting gyroscopic rigidity about said major axis when predetermined relative displacements between said gimbal and rotor structure about said minor axis are exceeded, means for applying torque about said major gyro axis, means for sensing relative displacements between said rotor structure and gimbal from a predetermined orientation, means for actuating said torque-applying means selectably to apply torque in one angular direction about said major axis and to apply torque in the opposite direction about said major axis responsive to said sensing means, and setting means for first setting said actuating means to cause torque to be applied in one direction about said major axis and then setting said actuating means to cause torque to be applied in the opposite direction about said major axis responsive to said sensing means.

12. Gyroscopic apparatus comprising a gimbal supported for movement about a major axis, a gyro rotor structure suspended by said gimbal for relative angular displacement in relation to said gimbal about a minor axis normal to said major axis, means interrupting gyroscopic rigidity about said major axis when predetermined relative displacements between said gimbal and rotor structure about said minor axis are exceeded, means for applying torque about said major gyro axis, first means for sensing relative displacements between said rotor structure and gimbal from a predetermined orientation, second means for sensing deviations in the orientation of said gimbal from a predetermined orientation about said major axis, means for actuating said torque-applying means selectably to apply torque in one annular direction about said major axis responsive to said second sensing means and to apply torque in the opposite direction about said major axis responsive to said first sensing means, and setting means for first setting said actuating means to cause torque to be applied in one direction about said major axis and then setting said actuating means to cause torque to be applied in the opposite direction about said major axis responsive to said sensing means.

13. Gyroscopic apparatus comprising a gimbal supported for movement about a major axis, a gyro rotor structure suspended by said gimbal for relative angular displacement in relation to said gimbal about a minor axis normal to said major axis, stop means limiting relative angular displacement between said rotor structure and gimbal, electrically-excited torque motor means for applying high torques about said major axis, means for electrically exciting said torque motor means to apply torque selectively in one and another angular direction about said major axis, and switching means for first coupling said exciting means with said torque motor means to occasion torque in one direction about said major axis, whereby said stop means are effective to interrupt gyroscopic rigidity of said gimbal and whereby said gimbal turns about said major axis, and for next coupling said exciting means with said torque motor means to occasion torque in the other direction about said major axis, whereby said gyroscopic rigidity is restored.

14. Gyroscopic apparatus comprising a gimbal supported for movement about a major axis, a gyro rotor structure suspended by said gimbal for relative angular displacement in relation to said gimbal about a minor axis normal to said major axis, stop means limiting relative angular displacement between said rotor structure and gimbal, electrically-excited torque motor means for applying high torques about said major axis, electrical pick-off means detecting displacements between said rotor structure and gimbal from a predetermined orientation about said minor axis, first exciting means for electrically exciting said troque motor means to apply torque in one direction about said major axis, second exciting means controlled by said electrical pick-off for electrically exciting said torque motor means to apply torque about said major axis in directions to restore said rotor structure and gimbal to said predetermined orientation, and setting means for sequentially coupling said first exciting means with said torque motor means and next coupling said second exciting means with said torque motor means, whereby upon operation of said setting means said rotor structure is first precessed until said stop means become effective, said gimbal then turns about said major axis, and said rotor structure then precesses to said predetermined orientation in relation to said gimbal.

15. Gyroscopic apparatus comprising a gimbal supported for movement about a major axis, a gyro rotor structure suspended by said gimbal for relative angular displacement in relation to said gimbal about a minor axis normal to said major axis, stop means limiting relative angular displacement between said rotor structure and gimbal, electrically-excited torque motor means for applying high torques about said major axis, first electrical pick-off means detecting displacements of said gimbal from a first predetermined orientation about said major axis, second electrical pick-off means detecting displacements between said rotor structure and gimbal from a second predetermined orientation about said minor axis, first exciting means controlled by said first pick-off for exciting said torque motor means to apply torque about said major axis when said gimbal is displaced from said first orientation, second exciting means for electrically exciting said torque motor means to apply torque about said major axis in directions to restore said rotor structure and gimbal to said second orientation, and setting means for sequentially coupling said first exciting means with said torque motor means and next coupling said second exciting means with said torque motor means, whereby said rotor structure and gimbal are set about both said major and minor axes upon operation of said setting means.

16. Gyroscopic apparatus comprising a gimbal supported for movement about a major axis, a gyro rotor structure suspended by said gimbal for relative angular displacement in relation to said gimbal about a minor axis normal to said major axis, stop means limiting relative angular displacement between said rotor structure and gimbal, electrically-excited torque motor means for applying high torques about said major axis, first electrical pick-off means detecting displacements of said gimbal from a predetermined orientation about said major axis, second electrical pick-off means detecting displacements between said rotor structure and gimbal from a second orientation about said minor axis, first exciting means for exciting said torque motor means to apply torque about said major axis responsive to signals from said first pick-off, second exciting means for exciting said torque motor means to apply torque about said major axis responsive to signals from said second pick-off, and manually-operated setting means for sequentially coupling said first exciting means with said torque motor means and next coupling said second exciting means with said torque motor means, whereby said rotor structure and gimbal are set about both said major and minor axes upon operation of said setting means.

17. Directional gyroscope apparatus comprising a main gimbal supported for movement about a normally-vertical major axis, a gyro rotor structure pivoted in said gimbal about a normally-horizontal minor axis, stop means limiting relative displacement of said rotor structure and gimbal about said minor axis and interrupting gyroscopic rigidity of said main gimbal about said major axis when said limited relative displacement is sought to be exceeded, means for applying high torques about said major axis, and manually-controlled setting means for sequentially and separately first actuating said torque-applying means to apply torque in one direction about said major axis and next actuating said torque-applying means to apply torque in the opposite direction about said major axis, whereby said setting means first causes said stop means to interrupt said gyroscopic rigidity and moves said gimbal about said major axis and next precesses said rotor structure to restore said gyroscopic rigidity.

18. Directional gyroscope apparatus comprising a main gimbal supported for movement about a normally-vertical major axis, a gyro rotor structure pivoted in said gimbal about a normally-horizontal minor axis, stop means limiting relative displacement of said rotor structure and gimbal about said minor axis and interrupting gyroscopic rigidity of said main gimbal about said major axis when said limited relative displacement is sought to be exceeded, means for applying high torques about said major axis, electrical pick-off means sensing relative displacements of said gimbal and rotor structure from a predetermined orientation about said minor axis, setting means for sequentially and separately actuating said torque-applying means first to apply torque in one direction about said major axis, whereby said rotor structure precesses until said gyroscopic rigidity is interrupted and said gimbal moves about said major axis, and next to apply torque in the opposite direction, whereby said rotor structure precesses to restore gyroscopic rigidity of said main gimbal, means coupling said setting means for response to signals from said pick-off when torque of said opposite direction is applied about said major axis, whereby said rotor structure automatically precesses to said predetermined orientation in relation to said gimbal, and manually-operated means for initiating operation of said setting means.

19. Directional gyroscope apparatus comprising a main gimbal supported for movement about a normally-vertical major axis, a gyro rotor structure pivoted in said gimbal about a normally-horizontal minor axis, stop means limiting relative angular movement between said rotor structure and said gimbal to less than 180 degrees, electrically-excitable torque motor means for applying high torques about said major axis, electrical pick-off means sensing relative angular displacements of said rotor structure from a predetermined orientation in relation to said gimbal about said minor axis, first means for electrically exciting said torque motor means to apply torque in one direction about said major axis, second means responsive to signals from said pick-off for electrically exciting said torque motor means to apply torque about said major axis in directions to precess said rotor structure to said predetermined orientation when said rotor structure is displaced from said orientation, switching means for selectably and separately coupling said first and second exciting means with said torque motor means, and manually-operated means for sequentially actuating said switching means first to couple said first exciting means with said torque motor means and next to couple said second exciting means with said torque motor means.

References Cited in the file of this patent
UNITED STATES PATENTS

| | | |
|---|---|---|
| 894,838 | Leavitt | Aug. 4, 1908 |
| 2,098,564 | Carter et al. | Nov. 9, 1937 |
| 2,200,976 | Bates | May 14, 1940 |
| 2,524,553 | Wendt | Oct. 3, 1950 |

UNITED STATES PATENT OFFICE

CERTIFICATE OF CORRECTION

Patent No. 2,801,542                                           August 6, 1957

Harry C. Wendt

It is hereby certified that error appears in the printed specification of the above numbered patent requiring correction and that the said Letters Patent should read as corrected below.

Column 11, line 12, for "torgue" read -- torque --; column 12, line 59, for "annular" read -- angular --; column 13, line 23, for "troque" read -- torque --.

Signed and sealed this 12th day of November 1957.

(SEAL)
Attest:
KARL H. AXLINE
Attesting Officer

ROBERT C. WATSON
Commissioner of Patents